United States Patent [19]
Reiker

[11] Patent Number: 5,965,845
[45] Date of Patent: *Oct. 12, 1999

[54] ELECTRICAL BOX WITH CUTOUT AND SUPPORT FOR CARRYING FIXTURES

[76] Inventor: Kenneth H. Reiker, 269 Country Club Dr., Shalimar, Fla. 32579

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/862,379

[22] Filed: May 23, 1997

Related U.S. Application Data

[63] Continuation-in-part of application No. 08/490,757, Jun. 15, 1995, and application No. 08/371,695, Jan. 12, 1995, Pat. No. 5,854,443

[60] Provisional application No. 60/023,060, Aug. 2, 1996, and provisional application No. 60/018,227, May 24, 1996.

[51] Int. Cl.⁶ ...................................................... H02B 1/32
[52] U.S. Cl. .............................. 174/62; 174/58; 220/3.3; 220/3.9; 248/906; 248/205.3
[58] Field of Search ................................. 174/51, 58, 61, 174/62, 48, 53, 57; 220/3.2, 3.3, 3.8, 3.9; 248/906, 205.3

[56] References Cited

U.S. PATENT DOCUMENTS

| | | | |
|---|---|---|---|
| 950,176 | 2/1910 | Hublinger | 174/62 |
| 1,040,175 | 10/1912 | Earhart | 174/62 |
| 1,922,432 | 8/1933 | Gould | 220/3.94 |
| 2,713,983 | 7/1955 | Kay . | |
| 3,340,349 | 9/1967 | Zerwes | 174/53 |
| 3,616,096 | 10/1971 | Roeder | 248/205.3 X |
| 3,770,872 | 11/1973 | Brown | 174/53 |
| 4,275,862 | 6/1981 | Takagi et al. . | |
| 4,281,773 | 8/1981 | Mengeu | 174/53 X |
| 4,306,109 | 12/1981 | Nattel | 174/51 |
| 4,315,100 | 2/1982 | Haslbeck et al. | 174/53 X |
| 4,424,406 | 1/1984 | Slater et al. . | |
| 4,892,211 | 1/1990 | Jorgensen . | |
| 4,919,292 | 4/1990 | Hsu | 174/61 X |
| 5,303,894 | 4/1994 | Deschamps et al. . | |
| 5,359,152 | 10/1994 | Hone-Lin | 174/53 |
| 5,435,514 | 7/1995 | Kerr, Jr. . | |

FOREIGN PATENT DOCUMENTS

| | | |
|---|---|---|
| 2436518 | 5/1980 | France . |
| 1309950 | 3/1973 | United Kingdom . |

*Primary Examiner*—Dean A. Reichard
*Attorney, Agent, or Firm*—Shlesinger, Arkwright & Garvey LLP

[57] ABSTRACT

An electrical junction box or mounting assembly includes a box having a top wall and a side wall. The side wall extends downwardly away from the top wall and defines a cavity therein. A supplemental fixture support is disposed in the cavity. An opening is provided in the side wall, and the supplemental fixture support extends into the opening. A threaded hole may be provided on the supplemental fixture support. The supplemental fixture support may be a rivet. Preferably, the supplemental fixture support is sufficiently smooth for preventing wear to plastic-coated electrical wire which engages exposed surfaces of the fixture support.

54 Claims, 6 Drawing Sheets

FIG. 12
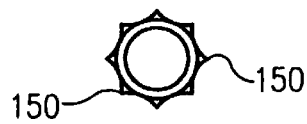
FIG. 11
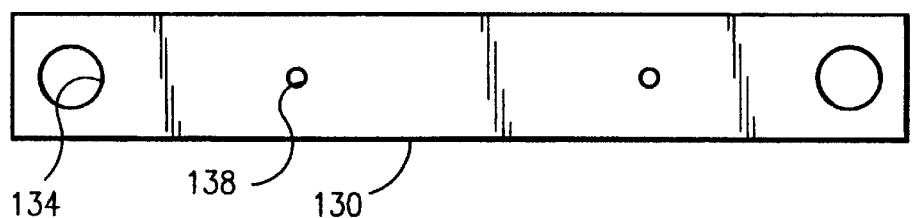
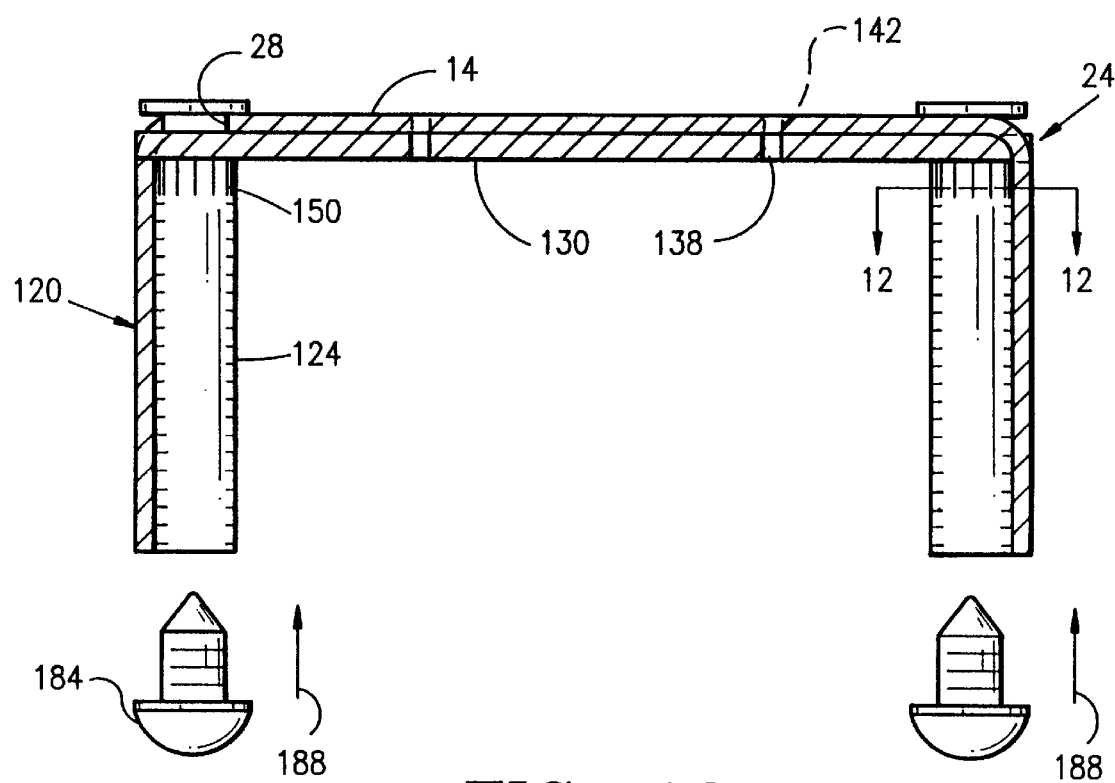
FIG. 10

ELECTRICAL BOX WITH CUTOUT AND SUPPORT FOR CARRYING FIXTURES

CROSS-REFERENCE TO RELATED APPLICATIONS

This application claims the priority of application Ser. No. 60/023,060, filed Aug. 2, 1996, and this application claims the priority of application Ser. No. 60/018,227, filed May 24, 1996, and this application is a continuation-in-part of application Ser. No. 08/490,157, filed Jun. 15, 1995, and this application is a continuation-in-part of application Ser. No. 08/371,695, filed Jan. 12, 1995, now U.S. Pat. No. 5,854,443 and each of which is incorporated herein by reference.

This application likewise relates to two(2) concurrently filed applications: application Ser. No. 08/862,378, filed May 23, 1997, and application Ser. No. 08/862,380, filed May 23, 1997, and each of which is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to take out the radius of a standard industry size electrical box so that a support screw for supporting a fixture can be located the proper distance from a second support screw to meet National Electrical Code (NEC) standards.

Another object of the invention is to eliminate the problem of the upper radius between the top wall and side wall of electrical boxes that prevents fixture support studs from being fitted next to the inside face of such side walls.

Another object of the invention is to achieve a strengthened electrical box with a supplemental support within a standard so-called "4×4" box, while maintaining the near universal 3.5 inch (8.9 cm) spacing between the fixture supports so that the box is usable with standard light fixtures, ceiling fans, and the like.

It is likewise an object of the invention to provide supplemental metal inserts in the electrical boxes to enhance the carrying strength of the electrical boxes.

A further object of the invention is to provide studs in the electrical boxes that strengthen the electrical boxes.

Yet another object of the invention is to provide studs in the electrical boxes which cover the threads of standard screws so that no screw threads are present in the interior of such electrical boxes.

A still further object of the invention is to provide an electrical box having a supplemental support with a sufficiently smooth exterior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no welding during assembly thereof.

Yet another object of the invention is to provide an electrical box having components which are easily fabricated, added to the electrical box, and assembled in the final form by the operation of screwing or riveting, yet which do not loosen when subjected to static and/or dynamic loading.

A still further object of the invention is to provide a junction box in which the supplemental support for carrying static and dynamic loads automatically engages the side walls of the junction box during assembly and/or in use thanks to the use of cutouts in the top wall thereof and/or thanks to the auxiliary support being configured for engaging the side wall thereof when the auxiliary support is attached and located in its attached, final form ready for use.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly which includes a box having a top wall and a side wall. The side wall extends downwardly away from the top wall and defines a cavity therein. A supplemental fixture support is disposed in the cavity. An opening is provided in the side wall, and the supplemental fixture support extends into the opening. A threaded hole may be provided on the supplemental fixture support. The supplemental fixture support may be a rivet. Preferably, the supplemental fixture support is sufficiently smooth for preventing wear to plastic-coated electrical wire which engages exposed surfaces of the fixture support.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

BRIEF DESCRIPTION OF THE DRAWINGS

FIG. 10 is a cross-sectional view of yet another preferred embodiment of a junction box according to the invention that has a support plate in addition to supplemental supports;

FIG. 11 is a top plan view of the support plate of FIG. 10;

FIG. 12 is a cross-sectional view of the elongated portion of the supplemental support of FIG. 10, taken along line 12—12 of FIG. 10;

DESCRIPTION OF THE PRIOR ART

Figure 1:
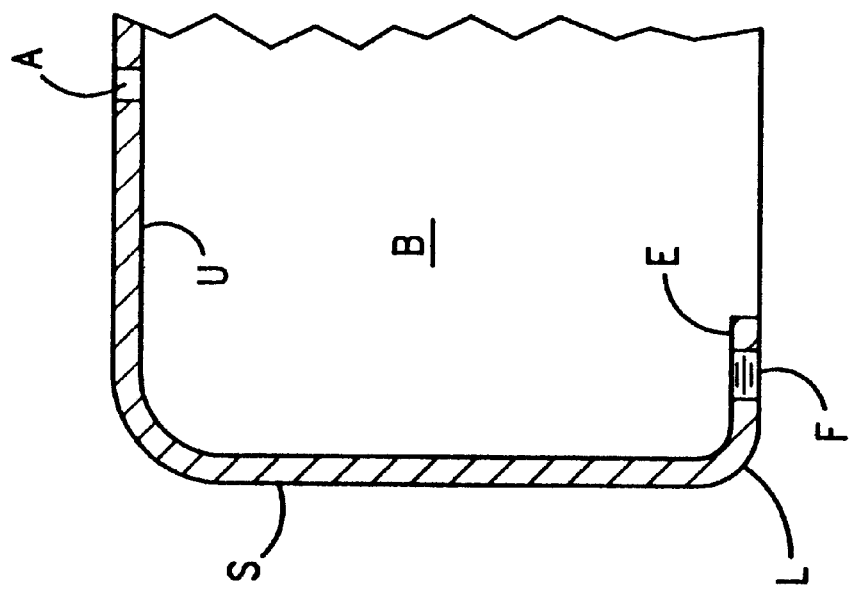
FIG. 1 is a cross sectional view of a PRIOR ART electrical junction box having an inwardly extending ear E with a faceplate plate attachment hole F provided therein.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes E is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 cm$^2$)

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes suited for carrying the vertical force of a small light fixture, a subsequent owner/user will often replace the original light fixtures with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Figure 2:
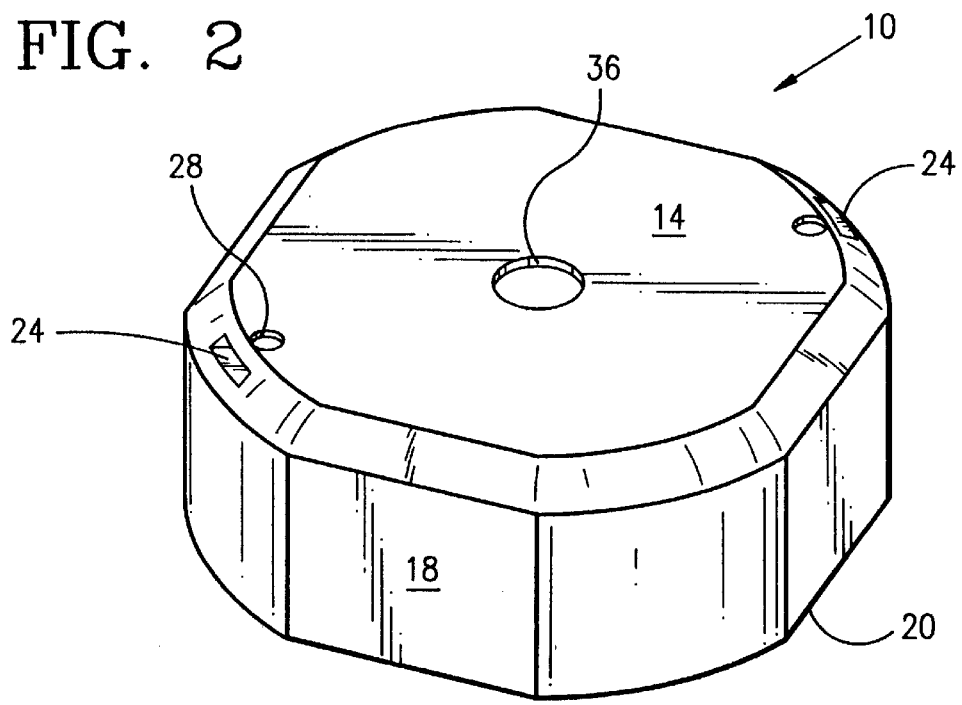
FIG. 2 is a top perspective view of a preferred embodiment of an electrical junction box according to the invention having punchouts in a top wall thereof, prior to addition of a supplemental support.
Figure 3:
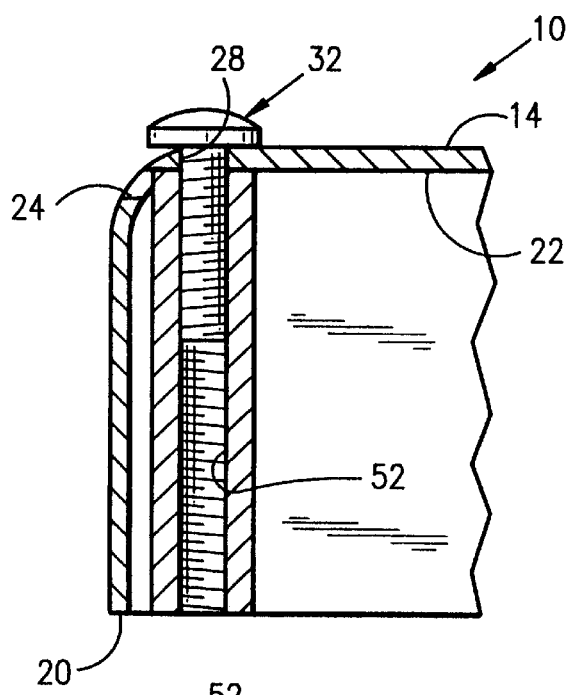
FIG. 3 is a cross-sectional view of the preferred embodiment of FIG. 2 showing the use of fasteners to secure a supplemental support to the junction box.

Turning to FIGS. 2 and 3, a first preferred embodiment of an electrical box and/or junction box 10 according to the invention will now be described in detail.

Junction box 10 includes a top wall 14, and a side wall 18 extending downwardly therefrom and defining a cavity therein. Side wall 18 includes a lower free edge 20, and top wall 14 includes a lower face 22.

Preferably, one or more punchouts 24 are provided on top wall 14, for example. Typically, at least one hole 28 will be provided adjacent the punchout region for receiving a fastener 32 therethrough.

Additional holes 36 for receiving portions of an electrical fixture, for example, and/or for fasteners which secure junction box 10 to a ceiling, for example, may likewise be provided.

Figure 4:
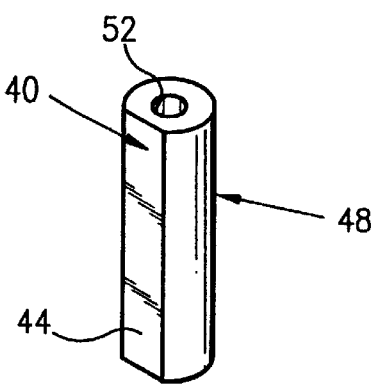
FIG. 4 is a top perspective view of a supplemental support which may be used with each of the embodiments of FIGS. 2–3 and 7–9.

FIG. 4 illustrates a supplemental support 40 which may be provided for increasing the holding strength of junction box 10.

Supplemental support 40 may be made with a height substantially equal to the distance between lower free edge 20 and lower face 22 of top wall 14.

When increased resistance to inadvertent turning of supplemental support 40 about the longitudinal axis of fastener 32 is desired, supplemental support 40 may be provided with a face 44 configured for engaging with a portion of side wall 18 for restricting rotation of supplemental support 40. As shown in FIG. 4, configured face 44 may be made as a flat face. The non-configured exterior face of supplemental 40 may be made as a rounded face 48, as shown.

Good results have been achieved when a threaded hole 52 is provided extending at least partially through supplemental support 40. Preferably, threaded hole 52 has threads selected to mate with those of fasteners 32.

Supplemental support 40 may be attached to box 14 by use of a powered screwdriver driving (i.e., turning) fastener 32 into threaded hole 52. The threads of threaded hole 52 may extend a the way through support 40, as shown in FIG.

3, for example, so that an additional, unillustrated fastener for attaching a light fixture or ceiling fan, for example, may be attached to supplemental support 40 and, hence, to electrical box 10, from below during use.

It is likewise contemplated that threads 52 will only be provided at the top portion of support 40, at the bottom portion of support 40, or at both top and bottom portions with an unthreaded region in between.

Still further, it is expected that the threads 52 for mating with fastener 32 may be of a different size than the threads provided for mating with the fasteners which attach the ceiling fan or light fixture to the lower portion of support 40 when in use.

Support 40 may have a variety of external configurations as well, such as being a full, cylindrical shape with no flat face 44, a hexagonal supplemental support 40, a triangular supplemental support 40, and other configurations which achieve the objects of the invention.

Good results have been achieved when an upper portion of supplemental support 40 extends sufficiently into punchout or opening 24. In that manner, support 40 may be located substantially adjacent to sidewall 18, so that sidewall 18 also assists in prevention of outward movement of support 40 that might lead to a loosening of the connection between fastener 32 and top wall 14, and undesirable loosening of the support 40 relative to box 10. When two supports 40 are attached to the left and right ones of holes 28, placement of support 40 at least partially within punchout 24 yields the added benefit of achieving a standard center-to-center spacing between respective threads 52 of each of the two supported supports, even when using a "standard" box forming equipment for making a standard box size, as discussed in greater detail below. Such also has the benefit of allowing use of standard equipment for forming holes in a sheetrock ceiling for receiving the box, while maintaining the standard 3.5 inch fixture support.

It will be appreciated that the preferred embodiment of FIGS. 2–3 yields a solution to the problems set forth in the previous pages. For large-scale production, a powered screwdriver can be used to assist in this major breakthrough by attaching support 40 to the wall of the electrical box 10.

Figure 5:
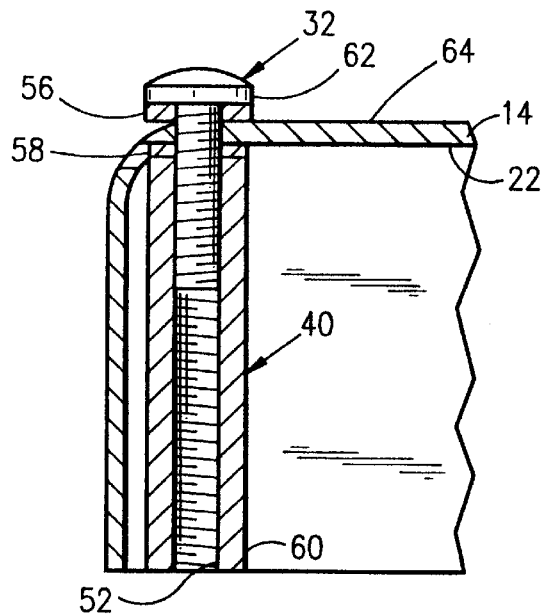
FIG. 5 is a cross-sectional view of another preferred embodiment of a junction box according to the invention.

FIG. 5 shows yet another preferred embodiment in which there are one or two washers 56, 58 disposed between a head 62 of fastener 32 and top surface 64 of top wall 14, and between lower surface 22 of top wall 14 and the top of support 40, respectively. As can be seen, and as in the other embodiments standard female threaded holes 52 are provided in the supports so as to accommodate the respective male threads of the fan, chandelier, light, and the like, that are supported.

Figure 6:
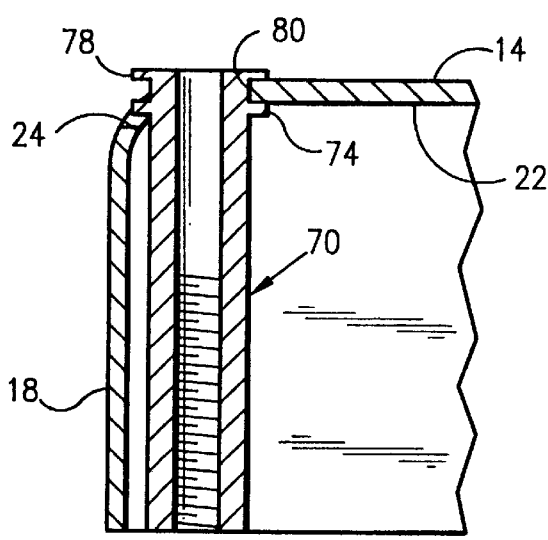
FIG. 6 is a cross-sectional view, similar to FIG. 5, of a still further preferred embodiment of a junction box according to the invention that has a supplemental support riveted thereto.

FIG. 6 illustrates a yet still further preferred embodiment of my invention that allows a riveted support stud 70 to be installed in the radius of the box by punching out or cutting out a portion of the steel box, i.e., providing punchout 24 described above. In that manner, a lower flange 74 of the support stud 70 is up against the upper inside face 22 of box 10 with a portion of the stud flange 74 extending into the free space created by such punchout 24 of box 10. Riveted support stud 70 likewise includes an upper flange 78 which engages the upper, exterior face of top wall 14.

During assembly of the embodiment of FIG. 6, rivet support 70 is inserted through a hole 80 in top wall 14, then support 70 is attached to top wall 14 by use of a hand-operated or automatic riveting tool. Such riveting of support 70 causes the tight engagement of flanges 74 and 78 with lower and upper faces of top wall 14, respectively, in a riveting operation that will be readily appreciated.

Figure 7:
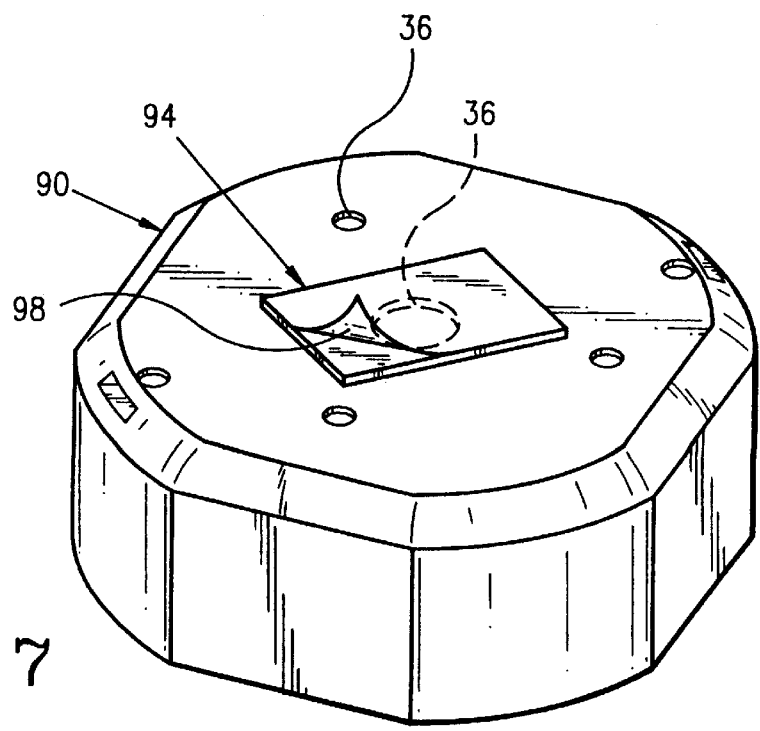
FIG. 7 is a top perspective view of yet another preferred embodiment of the invention, having a piece of double-sided tape on the top wall thereof for easing installation thereof.

FIG. 7 shows another preferred embodiment of a junction box 90 according to the invention.

Junction box 90 includes a piece of double-sided tape 94 (on top wall 14 thereof. Double-sided tape 94 may be provided with a protective strip or layer 98 on the outer face thereof, i.e., on the face of double-sided tape 94 that has not been adhered to junction box 90. Conventional double-sided tape 94 use.

Alternative means for adhering junction box 90 to a surface may be used, such as spray-on adhesive, a piece of putty and other adhering means, such as described in my earlier U.S. patent application Ser. No. 08/490,757, filed Jun. 15, 1995, and Ser. No. 08/371,695, filed Jan. 12, 1995, each of which is incorporated herein by reference, may be utilized in conjunction with or instead of the double-sided tape 94.

One of the many advantages of junction box 90 is that the user may remove protective layer 98, and then adhere double-sided tape 94 to the surface to which junction box 90 is to be attached. Double-sided tape is selected and sized so that sufficient holding power for temporarily adhering junction box 94 to the surface is achieved, while the user has both hands free for permanently attaching junction box 90 in the desired location by nails (or shooting screws) through one or more holes 36.

Preferably, the adhesive is sufficiently strong to adhere box 90 to a horizontal surface located above the user's head.

The thickness of double-sided tape 94 is coordinated with the thickness (i.e., height) of head 62 of bolt 32 so that each performs its intended function, when junction box 90 is provided with screw 32 of FIG. 3.

In a like manner, the height of the external portion of other supplemental supports will be coordinated with the thickness of adhesive material or double-sided tape 94. Specifically, when screw 32 and external washer 56 of the embodiment of FIG. 5 are used with junction box 90, the thickness of double-sided tape 34 must be selected to be at least as high, and preferably in most cases, higher than such height. When rivet 70 of FIG. 6 is used with junction box 90, adhesive material or double-sided tape 94 will be as thick or thicker than flange 78, as will be readily appreciated.

Alternatively, when attaching box 90 to a stud having a width less than distance between left and right heads 62, double-sided tape 94 need not extend away from top wall 14 a distance greater than the height heads 62. That is because the stud would fit in between the offset left and right heads 62.

Figure 8:
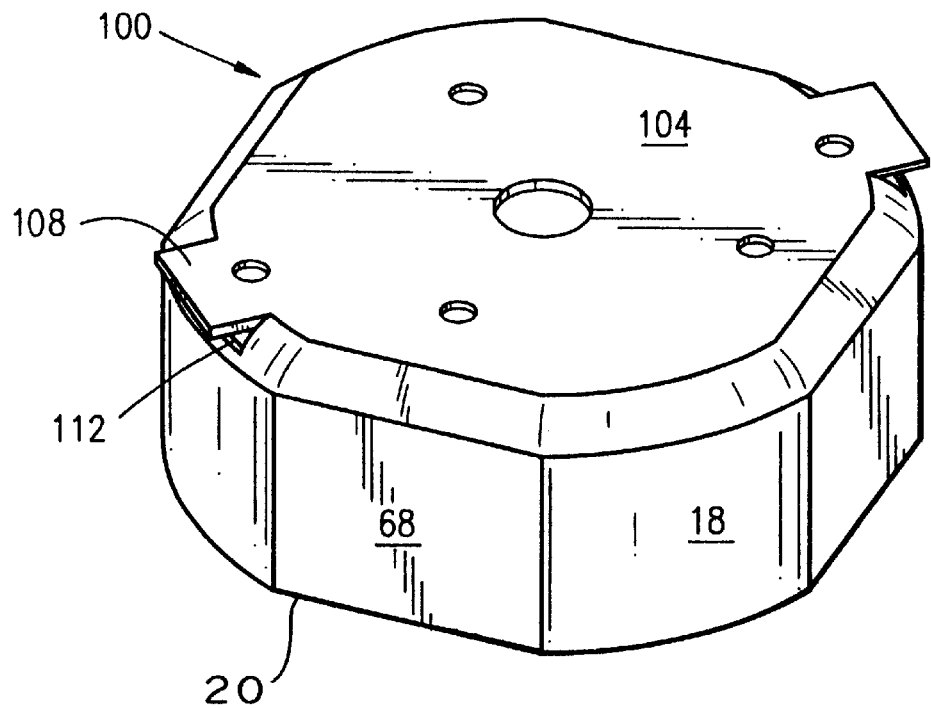
FIG. 8 is a top perspective view of another preferred embodiment of a junction box according to the invention having extensions and cutouts for receiving supplemental supports therein.
Figure 9:
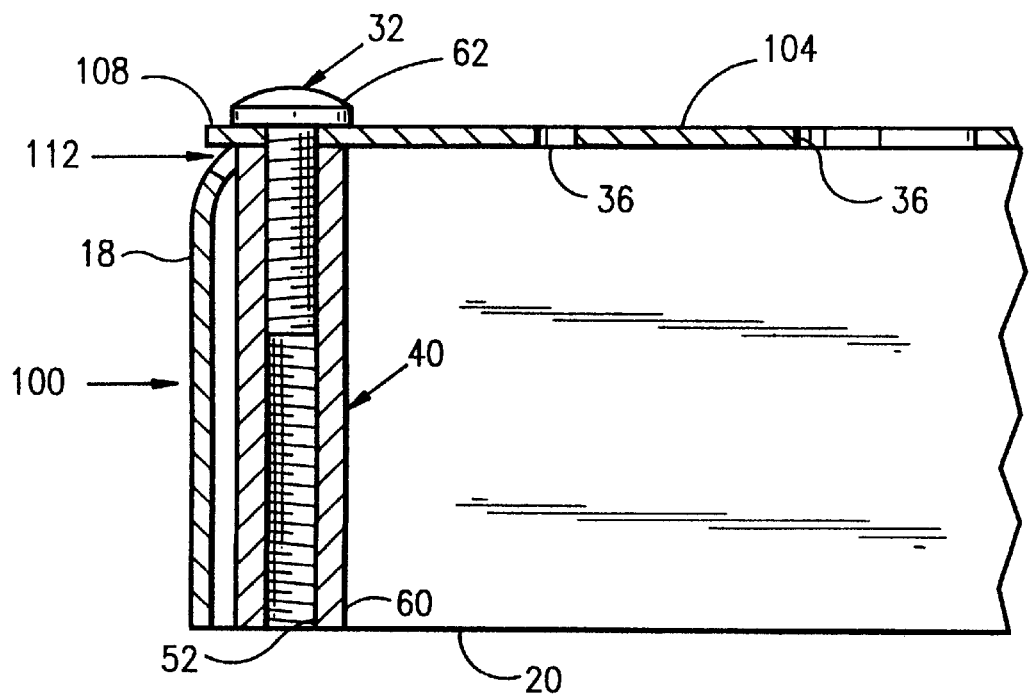
FIG. 9 is a cross-sectional view of a portion of the preferred embodiment of the junction box of FIG. 8.

The preferred embodiment of a junction box 100 illustrated in FIGS. 8 and 9 includes a top wall 104 having extensions 108 extending outwardly in the region of cutouts 112.

Any of the above-described supplemental supports, such as the illustrated support 40 or equivalents, may be used with junction box 100.

Extensions 108 are particularly suited for restricting rocking movements of fastener 32; i.e., restricting movement of fastener head 62 within a vertical plane defined by the two (2) illustrated extensions 108 of FIG. 8. One may consider a function of extensions 108 to include serving as built-in washers for strengthening the connection between fastener 32 and top wall 104 of junction box 100.

It will be appreciated that advantages of restricting the tendency of fastener head 62 (and the entire elongated portion of fastener 32) to move within a vertical plane helps maintain the integrity of the initial connection between fastener 32 and junction box 100; e.g., the connection between both top wall 104 and extension 108 and head 62, and between both top wall 104 and extension 108 and supplemental support 40.

Still further, restricting such tendency of fastener 40 to rotate within a vertical plane helps to ensure that fastener 32 and supplemental support 40 extend substantially parallel to side wall 18 of junction box 100 before and during use. Needless to say, all those aspects of fine-tuning of the connection between supplemental support 40 and the remainder of junction box 100 are geared for achieving predictability of where lower portion 60 of fastener 40 is.

Needless to say, the disclosed connections and configurations act to restrict all movements between support 40 and the remainder of box 100. The above discussion regarding restricting movement within a "vertical" plane is merely an example.

By restricting movement of support 40, there is achieved the desired predictability of where the lower portion of female thread 52 is located so that the desired spacing between a left hand one of supplemental support 40 and a right hand one of supplemental support 40 is achieved. Typically, the spacing between the commonly provided two (2) female fasteners 52 (i.e., left and right ones) attached to and extending from left and right ones of openings 28 as shown in the perspective views of FIGS. 2, 7 and 8 will be achieved. Known light fixtures, for example, are provided with respective left and right male fasteners, three-one half (3½) inches on center, which will be mated with such left and right female fasteners 52, during final use of the illustrated junction boxes.

All the advantages described regarding the stabilizing of fastener 52 and, hence, supplemental support 40, relative to the remainder of junction box 100 hold true for all the other preferred embodiments of the invention.

FIGS. 10–12 illustrate yet another preferred embodiment of a junction box 120 according to the invention.

Junction box 120 includes two spaced apart rivet-type supports 124, similar to support 70 described above. Junction box 120 likewise includes a supplemental plate or reinforcing element 130 for enhancing the properties thereof.

Preferably, support plate 130 may be sufficiently long so as to extend across substantially the entire width of junction box 120. In that case, apertures 134 are provided in reinforcing plate 130, and sized so that rivets 124 may be inserted therethrough during assembly.

In addition, optional holes 138 may be provided in support plate 130. Holes 138 are preferably located so as to align with respective ones of holes 142 in top wall 14 of junction box 120. It will be appreciated that, during use, fasteners will be inserted through aligned holes 138 and 142 for attaching junction box 120 to a support surface.

Good results have been achieved when extensions and/or knurling and/or roughened surfaces 150 are provided on an upper portion of support 124. When 150 is in the form of roughened surfaces, such roughened surfaces should be sufficiently roughened so as to engage one or both apertures 134 and the corresponding aligned hole 28 extending through top wall 14.

FIG. 12 illustrates an exaggerated cross-sectional view of the extensions 150 of support 124.

Opening or punchout 24 for receiving support plate 130 may be constructed as described above.

During assembly of junction box 120, support plate 130 may be inserted substantially parallel to top wall 114 through one of openings 24. After apertures 134 have been aligned with apertures 28, rivet support 124 is inserted through aperture 28, then through aperture 134, and then riveted (i.e., gripped and/or compressed in a standard fashion) so as to join top wall 14 and support plate 130 together.

During insertion of support 124, extensions 150 engage and cut into the sides of one or both of apertures 28 and 134 for restricting movement of support 124 after final assembly thereof.

In use, junction box 120 is attached to the desired surface by inserting fasteners through aligned holes 138 and 142. Then, the ceiling fan or light fixture is attached by use of fasteners 184, which will typically be provided with the ceiling fan to be attached. Fasteners 184 are inserted in the direction of an arrow 188, such as by screwing fasteners 184 in the usual manner.

Figure 13:
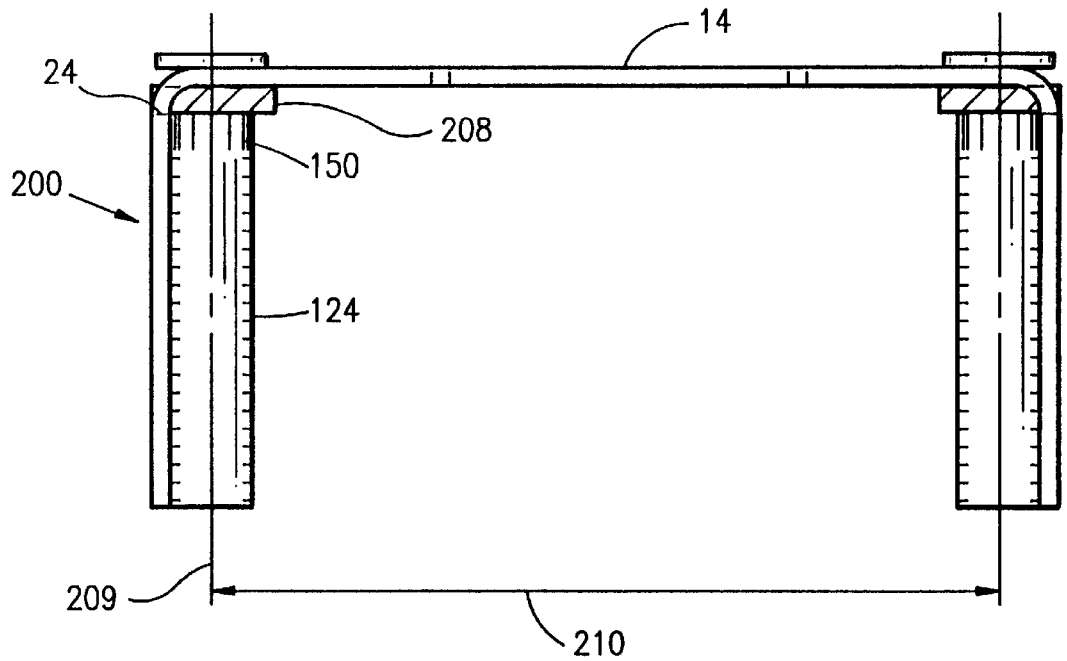
FIG. 13 is a cross-sectional view of a still preferred embodiment of a junction box according to the invention.
Figure 14:
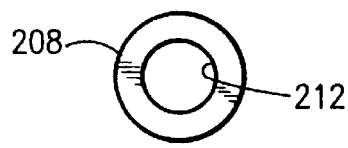
FIG. 14 is a top plan view of a support plate for use with the embodiment of FIG. 13.

FIGS. 13 and 14 illustrate another preferred embodiment of a junction box 200 according to the invention. Junction box 200 has cutouts 24 and supplemental supports 124, as described in detail above. One, or preferably two (2), washers or reinforcement plates 208 may be provided instead of or in addition to support 130 of the embodiment of FIGS. 10–12. Washer 208 includes an aperture 212 through which support 124 extends when assembled.

A centerline 209 of each support 124 is offset at a distance 210 from the other centerline 209. As in the other preferred embodiments described herein, thanks to removal of punchout 24, the left supplemental support 124 may be offset from the right supplemental support 124 by that distance 210, which distance 210 has been made the standard offset distance between fasteners for supporting lights, ceiling fans, and other fixtures. For example, in the United States, that standard distance 210 is about 3.5 inches.

Figure 15:
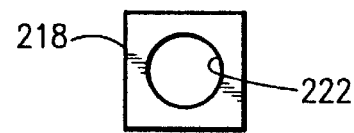
FIG. 15 is a top plan view of a further support plate for use with the embodiment of FIG. 13.

FIG. 15 illustrates an alternative washer 218 having an aperture 222 therethrough that may be used instead of the round washer 208 of FIG. 14.

When assembling junction box 200 with washer 208 or washer 218, each respective washer is inserted sideways through punchout 24; e.g., inserted substantially parallel to top wall 14 of junction box 200.

Washers 208 and 218 may have a thickness as thick as the height of punchout 24, in which case greater rigidity and resistance to movement and loosening of support 124 is achieved.

Figure 16:
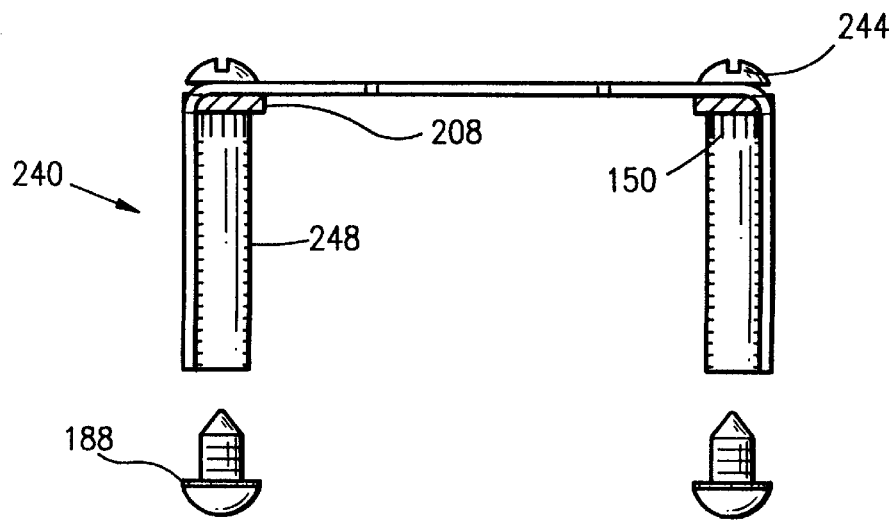
FIG. 16 is a cross-sectional view of yet another preferred embodiment of a junction box according to the invention.

Turning to FIG. 16, another junction box 240 according to the invention is shown. Junction box 240 is assembled in a manner similar to the assembly of junction box 200, for example, yet with fasteners such as screws or bolts 244 used to tighten supplemental support 248 relative to the remainder of box 240.

As to supplemental supports, such as the illustrated supports 40, 70, 124 and 248, it is likewise contemplated that such supplemental supports will have fully round cylindrical shapes, hexagonal-shapes, square shapes, shapes which are tapered at an upper portion thereof (i.e., shapes that have the appearance of truncated cones, and truncated pyramids. In addition, frustrums of pyramids and the other shapes are contemplated with truncation taken at angles other than the illustrated substantially 90° angle between the top face of respective supplemental supports 40, 70, 124 and 248 that contacts the lower face 22 of upper wall 14 of the various preferred embodiments of the junction box according to the invention.

In addition to the rivets and/or studs used in the embodiments of FIGS. 6, 10 and 13, it is expected that locking coupling nuts will be used to attach supplemental supports to the junction box, as well as any other means of fastening supplemental supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general these principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
   a) a box including a top wall and a side wall;
   b) said side wall extending downwardly away from said top wall and defining a cavity therein;
   c) a supplemental fixture support disposed in said cavity;
   d) an opening provided in said side wall;
   e) said supplemental fixture support extending into said opening;
   f) said supplemental fixture support including a rivet attached to said top wall;
   g) said rivet being attached to said top wall;
   h) a threaded hole provided in a lower portion of said rivet; and,
   i) said threaded hole being configured for receiving a fastener of a fixture to be supported by said rivet.

2. A device as defined in claim 1, wherein:
   a) said supplemental fixture support engages a portion of said side wall.

3. A device as defined in claim 1, wherein:
   a) said supplemental fixture support has an exposed surface which is sufficiently smooth for avoiding wear to plastic-coated electrical wire which engages said exposed surface when said box is in use.

4. A device as defined in claim 1, wherein:
   a) said threaded hole includes a bottom threaded hole provided on a bottom portion of said supplemental fixture support.

5. A device as defined in claim 1, wherein:
   a) a second supplemental fixture support is disposed in said cavity.

6. A device as defined in claim 5, wherein:
   a) a reinforcing plate extends between said supplemental fixture support and said second supplemental fixture support.

7. A device as defined in claim 6, wherein:
   a) at least one of said first and second fixture supports extends through said reinforcing plate.

8. A mounting assembly, comprising:
   a) a box including a top wall and a side wall;
   b) said side wall extending downwardly away from said top wall and defining a cavity therein;
   c) a supplemental fixture support;
   d) said supplemental fixture support being disposed adjacent said side wall;
   e) a fastener being disposed adjacent said top wall and said fixture support for securing said fixture support to said top wall;
   f) an opening being provided in one of said side wall and said top wall; and
   g) said opening being configured for receiving a top portion of said supplemental fixture support when said fastener secures said supplemental fixture support to said top wall.

9. A device as defined in claim 8, wherein:
   a) said opening is provided in a radiused portion of said box; and
   b) said radiused portion is disposed adjacent said top wall and said side wall.

10. A device as defined in claim 8, wherein:
    a) said supplemental fixture support engages said side wall when said fastener secures said supplemental fixture support to said top wall.

11. A device as defined in claim 8, wherein:
    a) said supplemental fixture support extends substantially the entire length from said top wall of said box to a bottom portion thereof.

12. A mounting assembly, comprising:
    a) a box including a top wall and a side wall;
    b) said side wall extending downwardly away from said top wall and defining a cavity therein;
    c) a supplemental fixture support disposed in said cavity;
    d) an opening being provided in a radiused portion of said box disposed between said top wall and said side wall; and
    e) said supplemental fixture support being configured for extending into said opening a sufficient amount for placing said supplemental fixture support substantially adjacent to said side wall.

13. A device as defined in claim 12, wherein:
    a) said side wall extends substantially perpendicularly to said top wall.

14. A device as defined in claim 13, wherein:
    a) said opening is disposed substantially completely in said radiused portion.

15. A mounting assembly, comprising:
    a) an electrical box;
    b) said electrical box including a top wall and a downwardly extending side wall defining a cavity therein;
    c) a hole provided in said top wall;
    d) a fixture support extending through said hole and into said cavity;
    e) said fixture support including an elongated body;
    f) said elongated body extending into said cavity;
    g) a reinforcement element disposed adjacent said fixture support;
    h) means disposed between said elongated body and said reinforcement element for fastening said reinforcement element and said elongated body together and for restricting movement of said elongated body relative to said reinforcement element and to said top wall; and
    i) said reinforcement element being disposed adjacent said top wall for reinforcing the engagement of said fixture support with said top wall for restricting movement of said fixture support relative to said top wall and for securing said fixture support to said top wall.

16. A mounting assembly as defined in claim 15, wherein:
a) a roughened surface is disposed on said elongated body for engaging said top wall and for restricting movement of said elongated body relative to said top wall.

17. A mounting assembly as defined in claim 15, wherein
a) said reinforcement element is disposed directly adjacent to said top wall.

18. A mounting assembly as defined in claim 15, wherein:
a) said fastening means includes a roughened surface disposed on said elongated body.

19. A mounting assembly as defined in claim 15, wherein:
a) said fastening means includes knurling sufficiently large for engaging said reinforcement element.

20. A mounting assembly as defined in claim 15, wherein:
a) said fastening means is provided on said elongated body.

21. A mounting assembly as in claim 15, wherein:
a) said fastening means includes knurling provided on said fixture support.

22. A mounting assembly as defined in claim 21, wherein:
a) said knurling on said elongated body is sufficiently large for engaging said reinforcement element.

23. A mounting assembly as defined in claim 15, wherein:
a) said reinforcement element is disposed inside the cavity.

24. A mounting assembly as defined in claim 23, wherein:
a) said reinforcement element is disposed directly adjacent to said top wall.

25. A mounting assembly as in claim 15, wherein:
a) said fixture support includes a head; and
b) said head is disposed outside said cavity.

26. A mounting assembly as defined in claim 15, wherein:
a) said head is integrally attached to said fixture support.

27. A mounting assembly as defined in claim 25, wherein:
a) said fixture support includes a free end disposed at a distance from said head; and
b) threads are provided on said free end of said fixture support.

28. A mounting assembly as defined in claim 27, wherein:
a) said threads include internal threads.

29. A mounting assembly, comprising:
a) an electrical box;
b) said electrical box including a top wall and a downwardly extending side wall defining a cavity therein;
c) a hole provided in said top wall;
d) a fixture support extending through said hole and into said cavity;
e) said fixture support including an elongated body;
f) said elongated body extending into said cavity;
g) a reinforcement element disposed adjacent said fixture support;
h) a roughened surface disposed between said elongated body and said reinforcement element for fastening said reinforcement element and said elongated body together and for restricting movement of said elongated body relative to said reinforcement element and to said top wall; and
i) said reinforcement element being disposed adjacent said top wall for reinforcing the engagement of said fixture support with said top wall for restricting movement of said fixture support relative to said top wall and for securing said fixture support to said top wall.

30. A mounting assembly as defined in claim 29, wherein:
a) a roughened surface is disposed on said elongated body for engaging said top wall and for restricting movement of said elongated body relative to said top wall.

31. A mounting assembly as in claim 29, wherein:
a) said fixture support includes a head; and
b) said head is disposed outside said cavity.

32. A mounting assembly as defined in claim 29, wherein
a) said reinforcement element is disposed directly adjacent to said top wall.

33. A mounting assembly as in claim 29, wherein:
a) said roughened surface includes knurling provided on said fixture support.

34. A mounting assembly as defined in claim 33, wherein:
a) said knurling on said elongated body is sufficiently large for engaging said reinforcement element.

35. A mounting assembly as defined in claim 29, wherein:
a) said reinforcement element is disposed inside the cavity.

36. A mounting assembly as defined in claim 35, wherein:
a) said reinforcement element is disposed directly adjacent to said top wall.

37. A mounting assembly as defined in claim 29, wherein:
a) said fixture support includes a free end disposed at a distance from said head; and
b) threads are provided on said free end of said fixture support.

38. A mounting assembly as defined in claim 37, wherein:
a) said threads include internal threads.

39. A mounting assembly, comprising:
a) an electrical box including a substantially flat top wall with upper and lower surfaces, and also a depending side wall, at the periphery thereof, defining a cavity therein;
b) an opening provided in said top wall;
c) an elongated fixture support extending through said opening in said top wall;
d) a head, which is substantially larger than said opening, disposed on an upper end of said fixture support, and which head engages the upper surface of said top wall;
e) said fixture support extending downwardly substantially parallel to said side wall;
f) the fixture support surface adjacent the head having an interengaging surface which will mechanically engage with and lock with an adjacent surface, the interengaging surface being disposed immediately adjacent to the head and extending below the lower surface of the top wall;
g) a reinforcing element disposed on said fixture support in contact with the lower surface of the said top wall; and
h) said interengaging surface both engaging the periphery of said opening in said top wall and engaging the reinforcing element to hold the head, top wall, and reinforcing element in sufficiently firm contact with each other so as to restrict lateral and rotational movement of said fixture support relative to said top wall of said box.

40. A mounting assembly as defined in claim 39, wherein:
a) said interengaging surface includes a plurality of circumferentially spaced extensions.

41. A mounting assembly, comprising:
a) an electrical box;

b) said electrical box including a top wall and a downwardly extending side wall defining a cavity therein;

c) a hole provided in said top wall;

d) a fixture support extending through said hole and into said cavity;

e) said fixture support including a head larger than the hole and an elongated body;

f) said head being disposed outside said cavity, and said elongated body extending into said cavity;

g) a roughened surface disposed on said elongated body for engaging said top wall and for restricting movement of said elongated body relative to said top wall;

h) a reinforcement element, said reinforcement element having an opening therein;

i) said elongated body extending through said opening in said reinforcement element and engaging said reinforcement element; and j) said reinforcement element being disposed adjacent said top wall for reinforcing the engagement of said fixture support with said top wall for restricting movement of said fixture support relative to said top wall.

42. A mounting assembly as defined in claim 41, wherein
a) said reinforcement element is disposed directly adjacent to said top wall.

43. A mounting assembly as defined in claim 41, wherein:
a) said roughened surface on said fixture support is sufficiently large for engaging said reinforcement element.

44. A mounting assembly as defined in claim 41, wherein:
a) said roughened surface includes a plurality of circumferentially spaced extensions.

45. A device as defined in claim 41, wherein:
a) said reinforcement element includes a plate which extends substantially across the width of the box.

46. A device as defined in claim 41, wherein:
a) said reinforcement element is substantially circular.

47. A device as defined in claim 41, wherein:
a) said reinforcement element is substantially rectangular.

48. A mounting assembly as in claim 41, wherein:
a) said roughened surface includes knurling provided on said fixture support.

49. A mounting assembly as defined in claim 48, wherein:
a) said knurling on said fixture support is sufficiently large for engaging said reinforcement element.

50. A device as defined in claim 48, wherein:
a) at least a portion of said knurling extends substantially in the direction of elongation of the elongated fixture support.

51. A mounting assembly as defined in claim 41, wherein:
a) said fixture support includes a free end disposed at a distance from said head; and
b) threads are provided on said free end of said fixture support.

52. A mounting assembly as defined in claim 51, wherein:
a) said threads include internal threads.

53. A mounting assembly, comprising:
a) a box including a top wall and a side wall;
b) said side wall extending downwardly away from said top wall and defining a cavity therein;
c) a supplemental fixture support disposed in said cavity;
d) an opening provided in said side wall;
e) said supplemental fixture support extending into said opening;
f) said top wall including an extension; and
g) said extension extending over a portion of said opening.

54. A device as defined in claim 53, wherein:
a) a threaded hole is provided on said supplemental fixture support.

* * * * *